(No Model.) 2 Sheets—Sheet 1.
T. DONOHO.
POTATO DIGGER.

No. 530,263. Patented Dec. 4, 1894.

Witnesses
Harry L. Amer.

Inventor
Thomas Donoho.
By his Attorneys,
C. A. Snow & Co.

(No Model.) 2 Sheets—Sheet 2.
T. DONOHO.
POTATO DIGGER.

No. 530,263. Patented Dec. 4, 1894.

Witnesses
Harry L. Amer.
O. E. Doyle

Inventor
Thomas Donoho.
By his Attorneys,
C. A. Snow & Co.

UNITED STATES PATENT OFFICE.

THOMAS DONOHO, OF EVERETT, MASSACHUSETTS.

POTATO-DIGGER.

SPECIFICATION forming part of Letters Patent No. 530,263, dated December 4, 1894.

Application filed June 13, 1894. Serial No. 514,444. (No model.)

*To all whom it may concern:*

Be it known that I, THOMAS DONOHO, a citizen of the United States, residing at Everett, in the county of Middlesex and State of Massachusetts, have invented a new and useful Potato-Digger, of which the following is a specification.

My invention relates to potato-diggers, and the objects in view are to provide an oscillating cage for loosening and removing the earth from the potatoes, whereby the latter are deposited upon the surface of the ground in rear of the machine; and, furthermore, to provide means whereby the elevation of the plow and the pressure upon the latter are directly under the control of the operator.

Further objects and advantages of the invention will appear in the following description, and the novel features thereof will be particularly pointed out in the appended claims.

Figure 1:
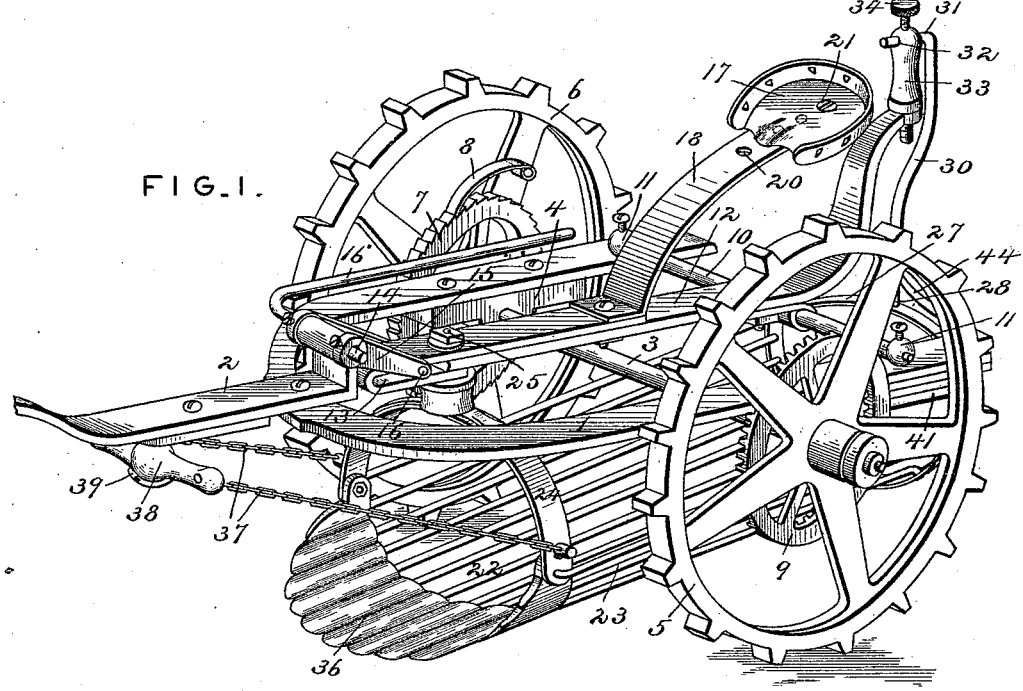
Figure 2:
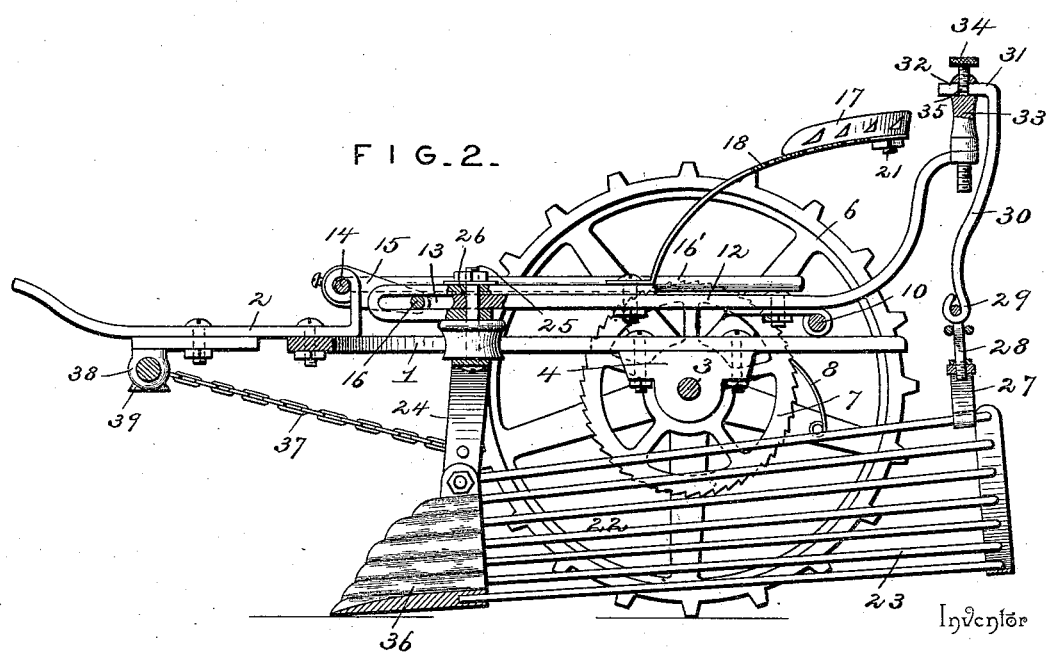
Figure 3:
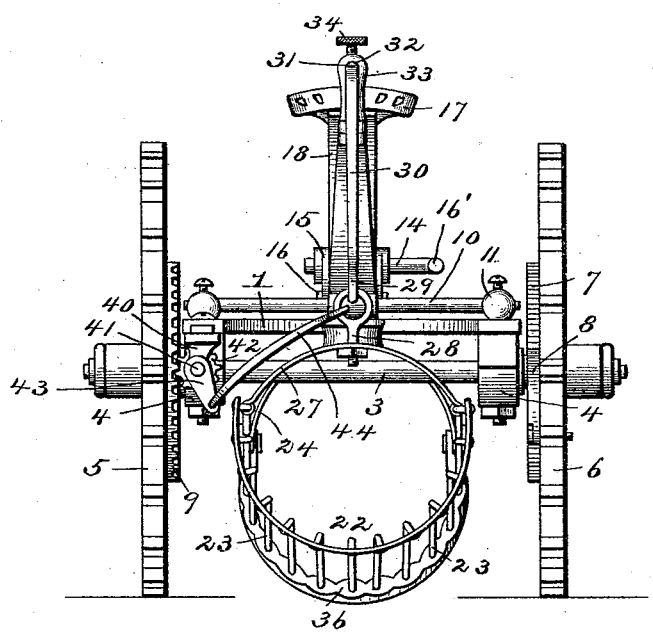
Figure 4:
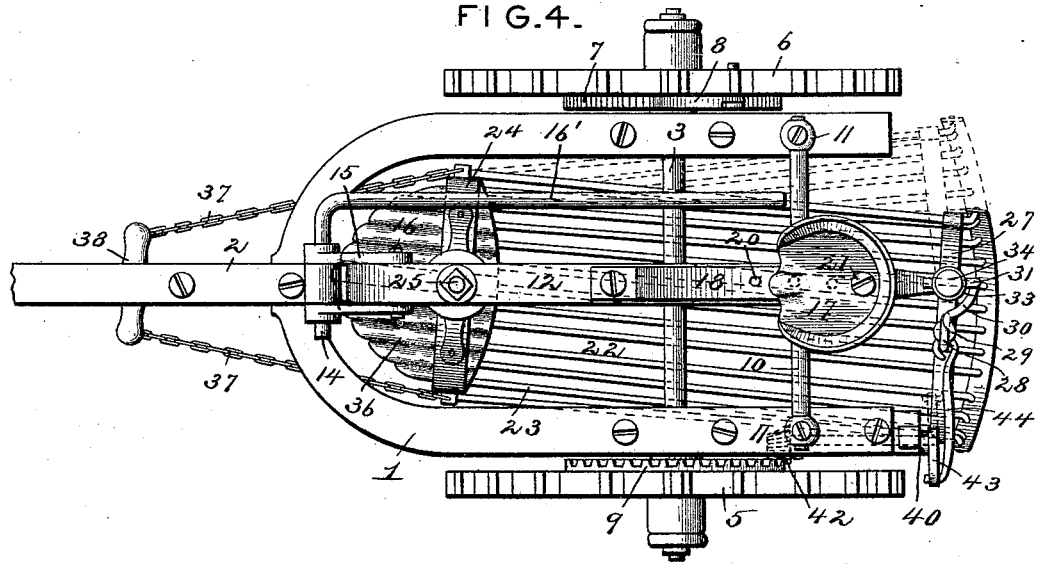

In the drawings:—Figure 1 is a perspective view of a machine embodying my invention. Fig. 2 is a longitudinal section of the same. Fig. 3 is a rear view. Fig. 4 is a plan view showing in full lines and in dotted lines respectively the opposite or limits of movement of the cage.

Similar numerals of reference indicate corresponding parts in all the figures of the drawings.

1 designates a draft frame of horseshoe form, to the front or looped portion of which is attached the rear end of the pole 2, and 3 represents the driving-shaft mounted in journals 4 secured to the under sides of the arms of the main frame and carrying ground-wheels 5 and 6. The ground-wheel 6 is loosely fitted upon the shaft, and adjacent thereto is arranged a ratchet-wheel 7, the peripheral teeth of which are engaged when the machine is advancing by a pawl 8 carried by said ground-wheel 6. Adjacent to the other ground-wheel 5 and fixed to the shaft is a gear 9, the function of which will be explained hereinafter.

10 represents a rock-shaft fitted in bearings 11 upon the upper sides of the arms of the main frame near their rear ends, and fixed to the center of this rock-shaft is a central bar 12, which is thus disposed between the vertical planes of the arms of the main-frame, and terminates short of the looped or closed end of said frame in a horizontal slot or guide 13. Mounted upon the main frame adjacent to the front extremity of said central bar is a crank-shaft 14, having a looped crank 15, the cross-bar 16 of which fits in said guide or slot at the front end of the central bar, and this crank-shaft is further provided with a lever or handle 16' which extends rearward to a point adjacent to the above described rock-shaft within reach of the operator disposed upon the seat 17. This seat is supported by a standard 18 secured to the central bar and extending upward and rearward over the rock-shaft, said standard being provided with a plurality of perforations 20 for the reception of the securing-bolt 21 of the seat, whereby said seat may be arranged either in front or in rear of the vertical plane embracing the axis of the rock-shaft to dispose more or less weight upon the front end of the central bar.

Supported at its front end by the central bar is the sifting-cage 22, said cage being semi-cylindrical in shape and being composed of a series of parallel longitudinal rods 23. At the front end of this cage is a bowed strap 24, to the center of which is attached a swivel-bolt 25 fitted in a vertical perforation 26 near the front end of the central bar, and at the rear end of the cage is a similar bowed strap 27 provided at its center with an eye 28, which is engaged with a similar eye 29 on the lower end of a hanger 30. This hanger consists of a substantially upright rod provided at its upper extremity with a spindle 31, which is loosely mounted in a bearing 32 at the upper end of a bracket 33 supported by the upturned rear end of the central bar. A set-screw 34 is arranged in the bearing 32 to engage a groove 35 in the spindle of the hanger to prevent the accidental displacement of the upper end of the latter. Attached to the front end of the sifting-cage is a plow 36, and attached at their rear ends to the front end of the cage are draft-chains 37, which extend forward and are fixed to the extremities of a pivotal cross-head 38 mounted for oscillation upon a spindle 39 depending from the draft-pole in advance of the front end of the main frame.

From the above description it will be seen that the cage is swiveled at its front end in the plane of the rear end of the plow proper and is loosely suspended at its rear end, whereby it is capable of oscillation between the planes of the ground-wheels, the above described draft chain serving to prevent straining of the swivel-bolt for the cage by communicating the forward movement of the machine directly from the draft-pole to the front end of the cage.

Mounted in bearings 40 depending from the arm of the main frame adjacent to the ground-wheel 5 is a shaft 41, provided with a pinion 42, which meshes with the gear 9, said shaft being provided with a crank-arm 43 connected by a pitman with the eye at the center of the rear bowed strap of the sifting cage. Therefore, during the forward movement of the machine the cage is rapidly oscillated, thus loosening and removing the earth from the potatoes as they are introduced by the plow and causing said potatoes to drop out of the cage at its rear end upon the surface of the plowed earth. By means of the hand-lever the front end of the cage, and hence the plow which is carried thereby, may be elevated to remove the plow from contact with the ground, as when moving to or from the field, and by adjusting the seat in the manner hereinbefore described, the operator may cause a greater or less downward pressure upon the plow to suit the character of the soil.

Various changes in the form, proportion, and the minor details of construction may be resorted to without departing from the spirit of the invention or sacrificing any of the advantages thereof.

Having described my invention, what I claim is—

1. In a potato-digger, the combination with a frame, and ground-wheels, of a central-bar pivotally mounted near its rear end upon the frame, means for adjusting the elevation of the front end of said bar, a sifting cage swiveled at its front end upon the central bar and loosely suspended at its rear end, a plow secured to and carried by the cage in advance of its pivotal point, and connections between the ground-wheels and the rear end of the cage for oscillating the latter laterally, substantially as specified.

2. In a potato digger, the combination with a frame and ground-wheels, of a central bar pivotally mounted near its rear end upon the frame, means for adjusting the elevation of the front end of said bar, a sifting cage swiveled at its front end upon the central bar and carrying a plow in advance of the point of swivel connection, a bracket arranged upon the rear extremity of the central bar and provided with a transverse bearing, a hanger provided at its upper end with a spindle mounted in said bearing and having a circumferential groove, a set-screw on the bracket engaging said groove, a loose connection between the lower end of the hanger and the rear end of the sifting-cage, and connections between the ground-wheels and the cage for oscillating the rear end of the latter, substantially as specified.

3. In a potato-digger, the combination with a frame, and draft tongue and ground-wheels, of a central-bar mounted upon the main frame, means for adjusting the elevation of the front end of said bar, a cage swiveled at its front end to the central bar, a pivotal hanger connecting the rear end of the cage with the rear end of the central bar, connections between the ground-wheels and the cage for reciprocating the same laterally, a plow carried by the front end of the cage, in advance of its swivel connection with the central-bar and draft-chains connected at their rear ends to the front end of the cage and at their front ends to a pivotal cross-head on the draft tongue, substantially as specified.

4. In a potato-digger, the combination with a frame, and ground-wheels, of a central bar fulcrumed at an intermediate point upon the main frame, a sifting cage swiveled at its front end to the central bar, means for elevating and depressing the front end of said bar, a plow carried by the front end of the cage, a swinging hanger connecting the rear end of the cage to the portion of the central bar in rear of its fulcrum, connections between the ground-wheels and the cage for oscillating the same laterally, and a seat having its standard supported upon the central bar and adjustably connected to its standard, whereby it may be arranged either in advance or in rear of the fulcrum point of the central bar, substantially as specified.

5. In a potato-digger, the combination with a frame having parallel side arms, and ground-wheels carried by a shaft mounted in bearings supported by said side arms, of a rock-shaft mounted in bearings near the rear ends of the side arms, a central bar fixed at an intermediate point to said rock-shaft and provided at its front end with a guide or slot, a crank shaft having a looped crank-arm engaging said guide or slot, a hand-lever connected to said crank-shaft, a sifting cage swiveled at its front end to the central bar and carrying a plow, means for suspending the rear end of the cage from the rear end of said central bar, and connections between the ground-wheels and the rear end of the cage, whereby said cage is laterally oscillated, substantially as specified.

In testimony that I claim the foregoing as my own I have hereto affixed my signature in the presence of two witnesses.

THOMAS DONOHO.

Witnesses:
JOHN R. JONES,
GUY DONOHO.